June 9, 1936. O. B. ARNTZEN 2,043,364
TANK GAUGE FLOAT
Filed Jan. 17, 1933 3 Sheets-Sheet 1
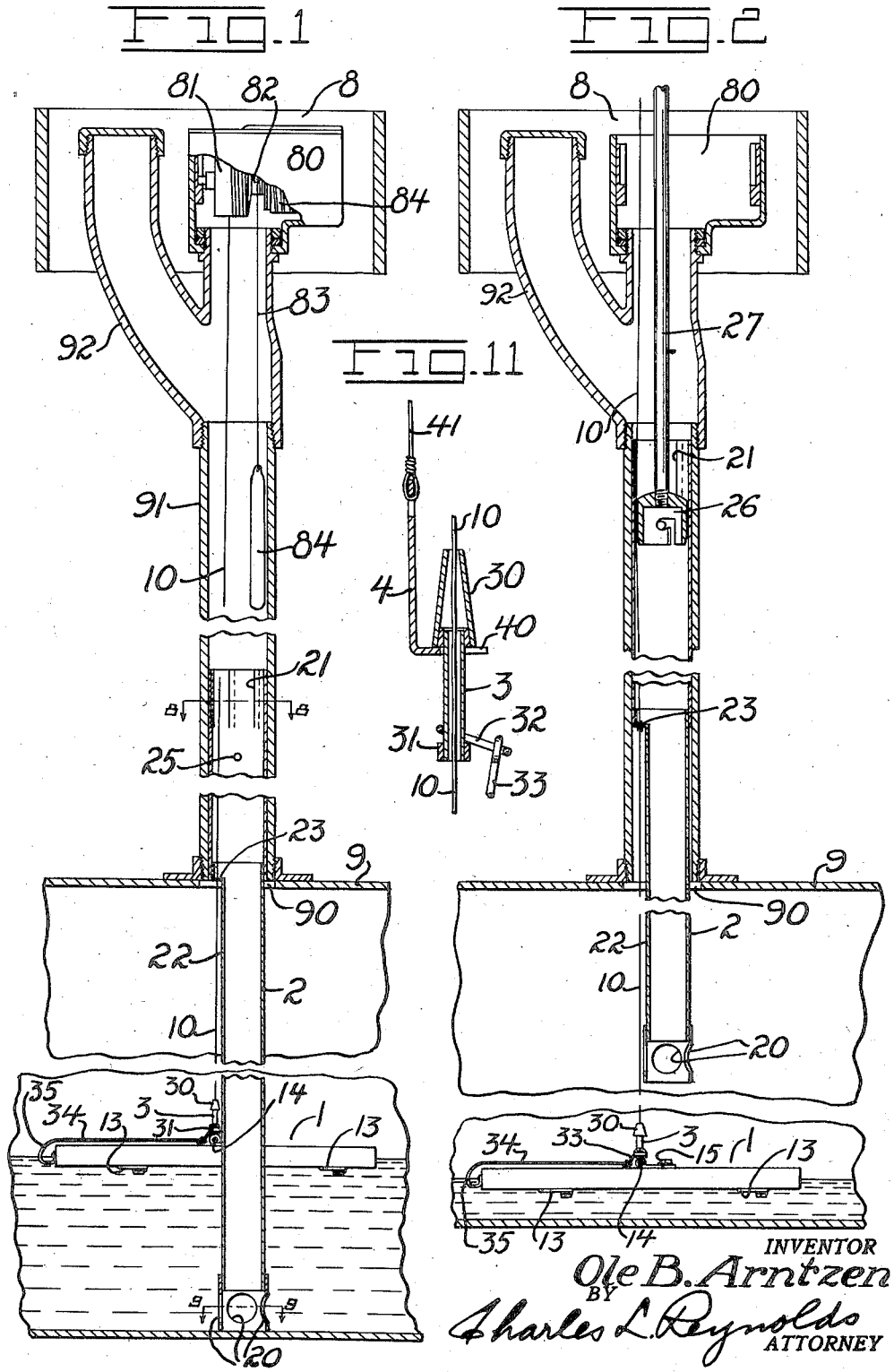
INVENTOR
Ole B. Arntzen
BY
Charles L. Reynolds
ATTORNEY

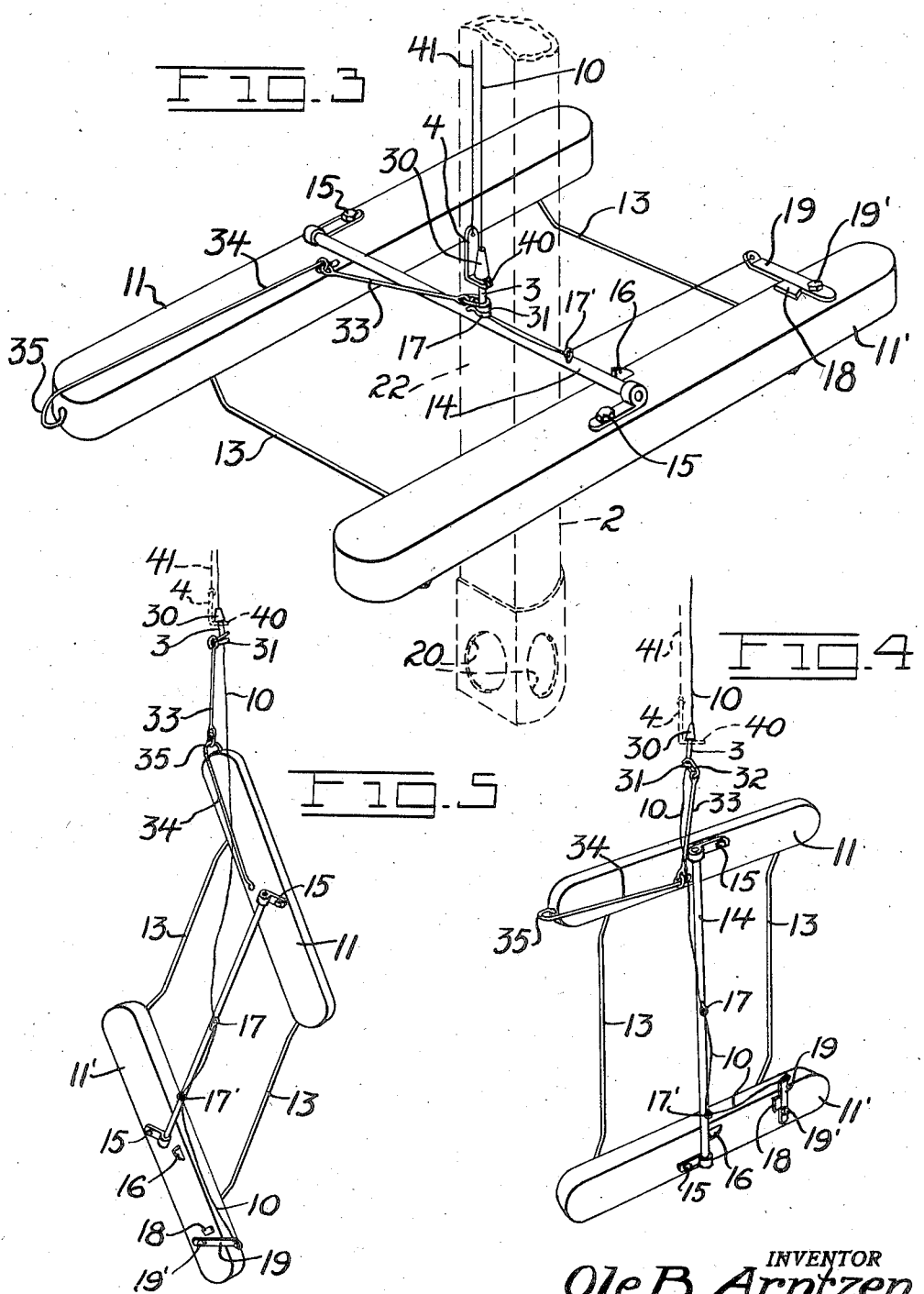

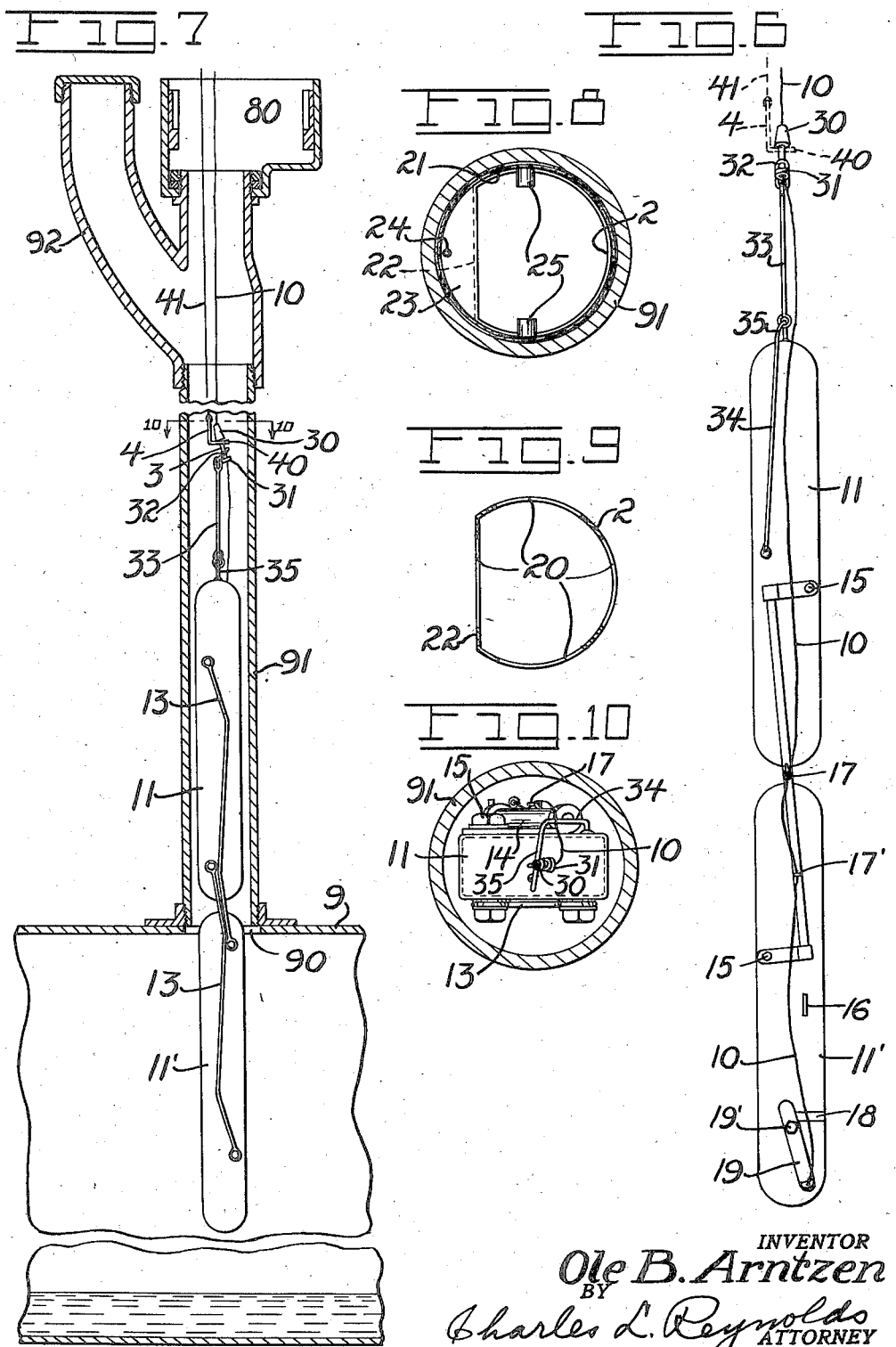

Patented June 9, 1936

2,043,364

UNITED STATES PATENT OFFICE 2,043,364

TANK GAUGE FLOAT

Ole B. Arntzen, Seattle, Wash., assignor to Gray-Arntzen Co., Seattle, Wash., a corporation of Washington Application January 17, 1933, Serial No. 652,116

17 Claims. (Cl. 73—82)

My invention relates to an improvement in means for gauging the level of liquid within tanks, and more especially to a float for use in such a connection, and to the pipe installation for filling the tank and for gauging through such filler pipe the level of liquid. The register mechanism which I have illustrated in connection with this installation is of the type shown in my Patent No. 2,006,531, though it will be understood that any suitable type of register mechanism may be used in connection with the float and pipe installation.

One of the objects of the present invention is to provide means whereby a float within a tank, and communicating through the filler pipe with a register mechanism above, can be made to gauge accurately the liquid level, and can be protected from incoming liquid, so that the accurate registering of the level will not be disturbed during the time the tank is being filled, nor at any other time.

It is a further object to provide a float for use in connection with such mechanism, which shall be of a size and buoyancy, and extend over such an area, that it will be stable, and of sufficient weight to easily operate the registering mechanism, and further, to provide such a float which can be collapsed for insertion within and removal from the tank through the filler pipe or the aperture to which the latter is or may be connected.

It is a further object to provide, in connection with such an installation, a means to maintain the float always in position immediately beneath the filler pipe, so that divergence from such position, by which the accuracy of registering would be affected, cannot occur.

It is also an object to provide means particularly for use in connection with a registering mechanism such as that disclosed in my companion application, wherein the register can be adjusted for accuracy after installation, whereby the float can be brought, after insertion within the tank, to a definite known position with which the register mechanism can be adjusted and calibrated.

It is a further object to provide an installation of this sort wherein the float is protected from the inflowing liquid, yet so arranged that the float can be collapsed and withdrawn when required.

It is a further object to provide a float for use in this or like installations, which is of simple character, and which in operative position is held by tension on the float line, extending above, in an extended position where it is stable, and yet which can be engaged from above and collapsed in order to permit it to be drawn upward to the ground level, if the tank is a subterranean tank.

Other objects, and more especially such as pertain to the mechanical details of my arrangement, will be understood as this description progresses.

My invention comprises the novel parts, and the novel combination and arrangement thereof, all as shown in the accompanying drawings, described in this specification, and as will be more particularly defined by the claims which terminate the same.

In the accompanying drawings I have shown my invention embodied in a form and in connection with an installation such as is now preferred by me.

Figure 1 is a general sectional view along the axis of the filler pipe, showing all parts in operative position, and Figure 2 is a similar view showing a step preliminary to the removal of the float.

Figure 3 is a perspective view of the float in operative position.

Figure 4 is a similar view, showing parts in a position preparatory to collapsing the float, and Figure 5 is a similar view showing the float approaching collapsed position.

Figure 6 is an elevation of the float in collapsed position, ready for insertion within or removal from the tank, and Figure 7 is a view similar to Figures 1 and 2 showing the operation of insertion or removal.

Figures 8, 9, and 10 are cross sections on the respective lines 8—8 and 9—9 of Figure 1, and 10—10 of Figure 7.

Figure 11 is a sectional detail view of the device associated with the float by means of which it can be collapsed and lifted.

The tank installation in general need not depart radically or at all from that now commonly in use for the storage of burner oil, gasoline, and the like in subterranean tanks. Thus the tank 9 has an aperture 90 to which is connected a pipe 91, through which the liquid is supplied to the tank. At the upper end of this pipe I prefer that it be branched, a Y 92 leading into the pipe 91 from the side, this Y 92 being the conduit through which the liquid is supplied. Preferably in line with the remainder of the pipe 91, at the upper end thereof, is a register mechanism generally indicated by the numeral 8. This may be enclosed within a register box 80 secured upon the upper end of the pipe 91, and may conveniently include a drum 81 over which a float line 10 is wound, a smaller drum 82 over which is wound a line 83 supporting a counterweight 84, and a helical scale 84 with which cooperates an index member (not shown) which registers the level of the liquid or which may be calibrated in units of volume. If the counterweight line 83 is wound upon its drum in reverse order to the winding of the float line 10 upon its drum, the counterweight will tend to maintain the float line 10, which at its lower end is connected to a float 1, in taut condition, and this of itself will serve to keep the float 1 immediately beneath the lower end of the pipe 91.

Since the float 1 must be disposed substantially vertically beneath the lower end of the pipe 91, in order that it will not by movement away from this position, elongate the float line 10 and thus give an incorrect indication, it is evident that it will be directly in the path of liquid flowing down the pipe 91, and if such liquid is permitted to drop upon the float the position of the float will be disturbed, and the float will not, during the filling operation, give a reliable indication of the level within the tank. In order to avoid such disturbance of the register mechanism and its float I provide a sleeve 2, which sleeve may be made of light material and of a length to extend from a point within the pipe 91 to the bottom of the tank 9. At its upper end means are provided whereby the sleeve 2 fits closely within the walls of the pipe 91, so that substantially all the liquid flowing down the pipe will be caught and contained within the sleeve 2 to flow downward through the sleeve. The sleeve is provided with outlet openings 20 at its lower end only, so that the discharge is entirely beneath the level of the liquid. Any liquid which passes between the upper end of the sleeve and the pipe will be of such small volume that it will flow along the surface of the sleeve, and will not disturb the float.

Any convenient means may be employed for causing the upper end of the sleeve to hug the walls of the pipe. As shown herein the upper end of the sleeve is slit, as indicated at 21, in such a manner that the edges of the slit overlap, or overlapping members are secured upon the upper end of the pipe, whichever is the most convenient method of manufacture, and these thin, overlapping members are given a permanent set radially outward so that they tend to enlarge, and thus by their spring action they closely hug the inside walls of the pipe. While such means are simple and cheap to make, any suitable means which accomplishes this purpose may be employed instead.

Since the float line 10 is inside the pipe 91, and the float 1 to which it is connected is outside the sleeve 2, means must be provided for communication through the wall of the sleeve, and such means must avoid binding or cutting of the float line. To this end I prefer that one side of the sleeve be flattened, as indicated at 22, and at its upper end this flattened portion is joined to the normal section of the sleeve by a transverse shoulder 23. This shoulder has a ferruled aperture at 24 for the passage of the float line therethrough. The float line is thus kept free from binding both above and below the aperture 24.

If the float is to be removable it is essential that the sleeve 2 be first removable, and, of course, the register mechanism 8, if it is positioned immediately above the upper end of the pipe 91, as shown, must be removable. In Figure 2 it has been shown as removed, and in order to engage the sleeve 2 and remove it I may provide means such as the inwardly projecting pins 25, adjacent the upper end of the sleeve, with which may be engaged a bayonet slotted tool 26 carried upon the end of a rod 27. The tool 26 is inserted through the upper end of the pipe, when the sleeve is to be removed, and its bayonet slot engages with the pins 25, whereupon the sleeve can be lifted through the upper end of the pipe 91.

A float which is sufficiently small to pass through a 2-inch pipe 91, such as is customarily employed in gasoline tank installations, is not ordinarily sufficiently stable to afford a reliable indication of the liquid level, wherein a difference of level of an inch will mean a volume of many gallons, and moreover, because of the restricted space within the tank, it cannot be made of such size and mass as to have a sufficiently great effect on the register mechanism. The fill pipes of such tanks are sometimes connected as close as six inches to the end of the tank, and if the float approaches this close to the tank, it may bind. This limits the length of such floats to less than 12 inches, but a 12-inch float of a size to pass through a two-inch pipe is too small in mass to give proper action upon the register. In other words, because of the absence of weight in the float, due to its necessarily small size, the register mechanism must be made extremely delicate in order to be affected by the slight weight of the float. It is desirable, therefore, to have a float of sufficient weight that it will easily and immediately affect the registering mechanism, and it is also desirable to have the float of such area when floating on the surface that it will be stable, and cannot be easily upset. Furthermore, the overall length of the float must not be great, for it may float crosswise of the tank, and if it be, say, twenty-two inches in length (to obtain sufficient mass), it may then subtend a chord of this length when the tank approaches the filled condition, which in a tank of 3½-foot diameter would leave a large dead space.

To accomplish these ends I form the float of a plurality of buoys, the form shown having two buoys, which to distinguish them are designated 11 and 11', and which need not exceed eleven inches in length, each. The buoys which form the float are so connected that the float as a whole may be collapsed disposing the buoys in tandem relation, wherein the longitudinal axes of all the buoys are collinear to form a structure having a cross sectional area approaching but not quite as large as the cross sectional area within the pipe 91, yet in operative position the float as a whole may be expanded to a formation wherein buoys are in abreast relation with their longitudinal axes substantially parallel, of approximately, that is very nearly, equal length and breadth to give it stability. Because the float can be formed of a plurality of buoys, with means connecting them, it can be given sufficient mass that it will have the desired effect upon the registering mechanism. Because the individual buoys are short, no dead space or lack of accurate indication can occur.

Thus, as one means of accomplishing these ends I form each of the buoys of a length which will give the float longitudinal stability, and I connect these buoys by parallel link members or struts 13, preferably connected to the under side of the float, which will in the operative position hold them spaced from each other and in abreast relation with their longitudinal axes substantially parallel, as shown in Figure 3, but which when the float is collapsed will hold the buoys in tandem relation with their longitudinal axes in alignment, as shown in Figure 7. In order to accomplish collapsing of the float for insertion or removal, and to insure that it will open when within the tank, and in order to hold the central point of the float as a whole in axial alignment with the pipe 91, I provide a third link or spacer member 14, pivoted at 15 to the buoys 11 and 11' at points which are substantially midway between the ends of the respective buoys. A stop 16 limits the opening movement permitted by these members 13 and 14, by its engagement with the latter, as may be seen in Figure 3.

At 17, upon the cross member 14, is fixed a guide for the float line 10, and another guide 17' is located toward one side of the member 14, substantially the same distance from the adjacent pivot point 15 that a swinging arm 19 is from its pivot point 19'. A stop 18 limits movement of the arm 19 to a position at right angles to the length of the buoy 11', upon which it is mounted, when swung in one direction, and to a position somewhat less than 90° from the first position, when swung in the opposite direction.

It will be seen that if the float line 10 is tensioned, it will exert a strain through the eyes 17 and 17' upon the arm 19, and if this pull on the arm 19 is slightly off center, parts being in the collapsed position shown in Figures 6 and 7, the arm 19 will swing until stopped by the stop 18, and the tension will now tend to draw the cross member 14 toward the arm 19. This will effect movement of the buoy 11' relative to the buoy 11 from the position in alignment, shown in Figure 6, to the open position, as shown in Figure 3, and parts will remain in this open or operative position as long as some tension is maintained on the line 10. This tension, it will be remembered, may be exerted by means of the counterweight 84.

Now in order to collapse the float, I provide, in association with the float line 10, a thimble 3 having an enlarged head 30 (see Figure 11), and an enlarged lower end 31. This thimble is freely slidable upon the float line 10. Encircling its central reduced portion, that is, above the enlarged lower end 31, is a loop 32, to which in turn is connected a link 33. The latter extends to the upper buoy 11, where it is slidable upon a guide wire 34 which extends from a point adjacent the central cross member 14 over and around an end of the buoy 11. Thus it has, in effect, a gooseneck at 35.

There is engaged with the head 30 of the thimble 3, or engageable therewith at such times as it is desired to remove the float, a lifting member 4. This may take any form which may be found suitable, and may be engaged in various ways. In effect, it consists of a pair of fingers 40 which engage beneath the head 30, and to it is connected a lifting line 41. With the member 4 engaged with the thimble 3, the thimble may be raised, sliding meanwhile on the line 10. Upward movement of the thimble lifts the link 33 and finally this link supports the float substantially in the position shown in Figure 4. The guide 34 is, in this position, so inclined that the end of the link 33 which is engaged therewith tends to slide along this guide until it reaches the gooseneck 35, and it is shown in this latter position in Figure 5. In this position, however, all the weight of the float is carried at one end of the buoy 11, and the float now commences to collapse, swinging on the pivots of the parallel link members 13 and 14. These parallel link members are of such length that they will permit the upper end of the buoy 11' to pass beneath the lower end of the buoy 11, and accordingly parts eventually assume the position shown in Figure 6, and in this position the entire float may be drawn upward through the aperture 90 and the pipe 91, as may be seen in Figure 10.

To reinsert the float within the tank, it is supported in collapsed position, as shown in Figure 6, and dropped through the pipe 91. When it reaches the liquid within the tank and is supported thereby, the float line 10 is tensioned, and the lifting line 41 is slackened. Tension on the line 10 tends to draw the thimble 3 and the eye 17 together, and consequently the link 33 slides back along the guide wire 34 until it reaches the end adjacent the cross member 14. The link 33 then swings around the wire 34 until the thimble 3 again brings up against the eye 17, and parts by now have reached the operative position shown in Figure 3.

It will be remembered that tension on the line 10 will tend to maintain the float 1 substantially immediately beneath the lower end of the pipe 91, and in order further to restrain the float, and to maintain it in this position, or even as the principal means of doing so, I prefer that the sleeve 2 be extended down through the center of the float, substantially between the cross member 14 and one of the links 13, and it is so shown in Figures 1 and 3. Thus the buoys lie at opposite sides of the sleeve 2, and the cross member 14 lies also at one side, and a link 13 at the opposite side of the sleeve. Consequently the float cannot depart materially from the position surrounding the sleeve 2.

It is desirable that there be some means whereby the float may be positioned at a definite level in the tank in order that the registering mechanism may be adjusted after installation, or if settling has occurred, thus to calibrate the registering mechanism, which may be provided with an adjustment for this purpose. To accomplish this the shoulder 23 may well be located a known distance above the bottom of the tank 9. Since the lower end of the sleeve 2 rests upon the bottom of the tank, and since the thimble 3 is definitely located with respect to the float 1, it is possible, by raising the entire float through the float line 10 until the thimble contacts with the under side of the shoulder 23, to locate the float at a definite level within the tank, and when it is in this position the registering mechanism can be accurately calibrated and adjusted.

What I claim as my invention is:

1. In combination with a subterranean tank and a pipe extending upward therefrom, register mechanism at the upper end of said pipe, a float within the tank, a float line extending from the float upward through the pipe to the register mechanism to operate the latter in accordance with the liquid level as determined by the float, and a sleeve closely fitting within the pipe above its lower end and extending below the liquid level, and having outlet openings only below such level, the float being maintained by engagement with said sleeve in position in line with the pipe, and the float line extending through a wall of the sleeve beneath the point where the latter closely fits the pipe.

2. In combination with a subterranean tank and a pipe extending upward therefrom, register mechanism at the upper end of said pipe, a float within the tank, a float line extending from the float upward through the pipe from the float to the register mechanism to operate the latter in accordance with the liquid level as determined by the float, a sleeve within the pipe having means at its upper end to fit closely within the pipe, and having a flattened wall portion at one side, a transverse shoulder at the upper end of such flattened portion connecting the same with the normal sleeve section, and apertured for the passage of the float line, whereby the float is disposed outside said sleeve, said sleeve extending below the liquid level and having outlet apertures beneath such level.

3. The combination of claim 2, the float being divided and lying at opposite sides of the sleeve, and means joining the parts of the float, said means and the float parts surrounding the sleeve to maintain the float at all times immediately beneath the pipe.

4. The combination of claim 2, including means associated with the float and engageable with the transverse shoulder of the sleeve to indicate, when engaged therewith, a definite level of the float.

5. A float for tank gauges comprising buoys and means joining the same for relative movement to space them laterally from each other in abreast relation, the float when in operative position being of an area in excess of that of an aperture in the tank, and means associated with the float and operable through such aperture for moving the buoys longitudinally and laterally from abreast relation into tandem alignment to condense the cross-sectional area of the float to less than that of such aperture, for removal of the float therethrough.

6. A float for tank gauges comprising two buoys each of cross-sectional area approaching that of an aperture in the tank, and parallel links connecting the same and swingable to align the buoys for movement through such aperture.

7. A float for tank gauges comprising two buoys each of cross-sectional area approaching that of an aperture in the tank, parallel links connecting the same and swingable to align the buoys for movement through such aperture, and means including a float line connected to said float and operable, when tensioned, to move the floats into spaced parallel position.

8. A float for tank gauges comprising two buoys each of cross-sectional area approaching that of an aperture in the tank, parallel links connecting said buoys and including a middle link pivoted adjacent the middle of the length of each buoy, a float line connected to one buoy near an end, and guides through which said line passes located upon said middle link, one adjacent the end pivoted to such latter buoy, and the other substantially midway of the length of the link.

9. A float for tank gauges comprising two buoys, means including parallel links to space the buoys apart in parallel relationship, a float line connected to the float, and means including a lifting line to apply a lifting force to one end of a buoy, thereby to swing the buoys into alignment.

10. A float for tank gauges comprising two buoys each of a cross-sectional area approaching that of an aperture in the tank, parallel links connecting said buoys and including a middle link pivoted adjacent the middle of the length of each buoy, a float line extending through the tank aperture and connected to the float at substantially the mid-point of said middle link, a thimble freely slidable on said float line, means to lift the thimble, and means connecting the thimble to a buoy, and operable when the thimble is lifted to apply a lifting force to one end of such buoy, thereby to swing the buoys into alignment.

11. A float for tank gauges comprising two buoys each of a cross-sectional area approaching that of an aperture in the tank, parallel links connecting said buoys and including a middle link pivoted adjacent the middle of the length of each buoy, a float line extending through the tank aperture and connected to the float at substantially the mid-point of said middle link, a thimble freely slidable on said float line, means to lift the thimble, a link connected at one end to the thimble, a guide wire on one buoy and extending from adjacent the middle link to and over one end, said thimble-connected link being slidable along said guide wire to the end of such float, when the thimble is lifted.

12. A float for tank gauges comprising two buoys each of cross-sectional area approaching that of an aperture in the tank, parallel links connecting said buoys and including a middle link pivoted adjacent the middle of the length of each buoy, a float line connected to one buoy near an end, guides through which said line passes located upon said middle link, one adjacent the end pivoted to such latter buoy, and the other substantially midway of the length of the link, a thimble freely slidable on said float line, means to lift the thimble, a guide wire upon the buoy complemental to that to which the float line is connected, and extending from adjacent the middle link, in a direction opposite the buoy-engaged end of the float line, to the opposite end of the complemental buoy, and around such end, and a link extending from the thimble to and slidable along the guide wire when the thimble is raised, to apply a lifting force to one end of the complemental buoy, and to swing the buoys into alignment.

13. In combination with a tank and a filling aperture therein, a float adapted to be inserted through such filling aperture, to float freely in the unconfined space of the tank, a float line extending upward from said float through the filling aperture to indicate the depth of liquid in the tank, and means to prevent liquid flowing into the tank through such filling aperture from striking said float.

14. A float for tank gauges comprising a plurality of buoys, means to dispose said buoys in such relationship, when in operative position, that two of the dimensions of the float exceed the size of an aperture in the tank, a float line operatively engaged with the float inwardly from its margin, and means engaged by a lifting line to shift said point of operative engagement to the end of a buoy, and to apply a lifting force at such end to the buoy, thereby to condense the dimensions of the float to a size permitting it to pass through such aperture.

15. In a tank gauge, in combination with a collapsible float and a float line extending upwardly from the float through an aperture in the tank, said float when in operative position being of such dimensions as preclude its passage through such aperture, means associated with the float line, and operatively connected to the float, and operable by engagement of a lifting line therewith to collapse the float, to enable its passage through the aperture, and means constraining said means to a position adjacent the center of the float, when the latter is in operative position, and to movement to a position adjacent the end of the float in collapsing the float.

16. A collapsible float for tank gauges comprising a plurality of buoys, means connecting said buoys for movement thereof between a collapsed position wherein the buoys are aligned in tandem relation, and an operative position wherein the buoys are laterally spaced apart, line-engaging means on the float, and a float line engaged by said line-engaging means and attached to a buoy, and operable by tensioning the float line to draw said line-engaging means toward the buoy to which said float line is attached, thereby moving said buoys out of tandem relation into laterally spaced-apart operative position.

17. In combination with a tank and a pipe extending upward therefrom, a float insertable through said pipe into said tank, comprising a plurality of buoys of a size in cross section such as to preclude passage through said pipe of two buoys placed side by side, means interconnecting said buoys and guiding the same for movement from an inoperative position wherein the buoys are arranged with their longitudinal axes collinear into an operative position wherein the buoys are disposed with their axes in nonaligned relation, and a float line operable by tensioning movement thereof to move the buoys from inoperative position to operative position.

OLE B. ARNTZEN.